US010352782B2

(12) United States Patent
Jokinen et al.

(10) Patent No.: US 10,352,782 B2
(45) Date of Patent: Jul. 16, 2019

(54) THERMAL MONITORING SYSTEM IN AN INTEGRATED CIRCUIT DIE

(71) Applicant: NXP USA, INC., Austin, TX (US)

(72) Inventors: Tommi Jorma Mikael Jokinen, Austin, TX (US); Firas N. Abughazaleh, Austin, TX (US)

(73) Assignee: NXP USA, INC., Austin, TX (US)

( * ) Notice: Subject to any disclaimer, the term of this patent is extended or adjusted under 35 U.S.C. 154(b) by 207 days.

(21) Appl. No.: 15/450,061

(22) Filed: Mar. 6, 2017

(65) Prior Publication Data

US 2018/0252597 A1 Sep. 6, 2018

(51) Int. Cl.
G01K 15/00 (2006.01)
G01K 7/01 (2006.01)
G01K 3/00 (2006.01)

(52) U.S. Cl.
CPC ............. *G01K 15/005* (2013.01); *G01K 7/01* (2013.01); *G01K 3/005* (2013.01)

(58) Field of Classification Search
CPC .................................................. G01K 15/002
See application file for complete search history.

(56) References Cited

U.S. PATENT DOCUMENTS 6,708,279 B1 3/2004 Takenaka
7,461,972 B2 12/2008 Cohen
8,027,798 B2* 9/2011 Johns .................. G01K 15/005
361/103
8,079,758 B2* 12/2011 Kamei .................. G01K 15/00
374/163
2015/0023386 A1 1/2015 Sinha et al.
2015/0168268 A1* 6/2015 Fish ................... G05B 23/0235
374/142
2015/0346001 A1* 12/2015 Tripathi .................. G01D 9/00
702/190

FOREIGN PATENT DOCUMENTS

CN 103323147 A 9/2013
WO 2006030374 A2 3/2006

OTHER PUBLICATIONS

U.S. Appl. No. 15/362,092, filed Nov. 28, 2016, and entitled "Temperature Sensor Circuitry and Method Therefor".

* cited by examiner

*Primary Examiner* — Clayton E. LaBalle
*Assistant Examiner* — Leon W Rhodes, Jr.
(74) *Attorney, Agent, or Firm* — David G. Dolezal

(57) ABSTRACT

An integrated circuit die that includes a temperature monitoring system that obtains measured temperature data from on die temperature sensors during a mode when power is not being supplied to a system controller of the die. After the system controller is powered up, the system controller obtains the measured temperature data. This system and method can be useful in that heat from a powered up system controller does not affect the temperature readings of the temperature monitoring system.

19 Claims, 4 Drawing Sheets

THERMAL MONITORING SYSTEM IN AN INTEGRATED CIRCUIT DIE

BACKGROUND OF THE INVENTION

Field of the Invention

This invention relates to a temperature monitoring unit for an integrated circuit die.

Description of the Related Art

Integrated circuit die can include temperature monitoring systems for detecting the temperature of the integrated circuit die. In some examples, these circuits can be used to determine whether the temperature is exceeding a predetermined threshold due to either internal or external conditions. If due to internal conditions, the integrated circuit can reduce operations to reduce the operating temperature or, if due to an external condition, provide warnings regarding the external condition.

In such examples, the temperature measured by the temperature monitoring system may have to be calibrated to account for variations in the die. In some examples, a subset of the integrated circuit die may be tested at known temperatures (e.g. such as in an oil bath) where the measured temperature can be compared with the actual temperature to develop calibration values to adjust the measured temperature reading to provide a more accurate measurement.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The Figures are not necessarily drawn to scale.

DETAILED DESCRIPTION

The following sets forth a detailed description of a mode for carrying out the invention. The description is intended to be illustrative of the invention and should not be taken to be limiting.

In a system that includes a temperature monitoring system, the temperature monitoring system and system controller are each located in independently operable power domains. During a calibration operation of the temperature monitoring system, the power domain to the system controller can be turned off so as to reduce or eliminate the effect of the operation of the system controller on the temperature measurements made during the calibration operation. During the calibration operation, temperature measurements made by the temperature monitoring system at a known temperature are stored in a memory location in the temperature monitoring system. After the calibration operation, the data is accessible to the system controller. The data can be used to generate calibration values for adjusting temperature data subsequently taken by a temperature monitoring system.

With prior art temperature monitoring systems, calibration measurements made by the temperature monitoring system during a calibration operation may be affected by heat generated by power being supplied to other circuitry of the integrated circuit including the system controller. Even though the other circuitry may not be operating during the calibration operation, heat can be generated by the other circuitry from leakage current due to power being supplied to the other circuitry. This heat may affect the accuracy of the measurements made during calibration, and consequently may affect the accuracy of the calibration values calculated from those measurements. Accordingly, providing a system with independent power supply domains and performing a calibration operation while power is not supplied to the system controller may provide, in some embodiments, an improved system that generates more accurate temperature data.

Figure 1:
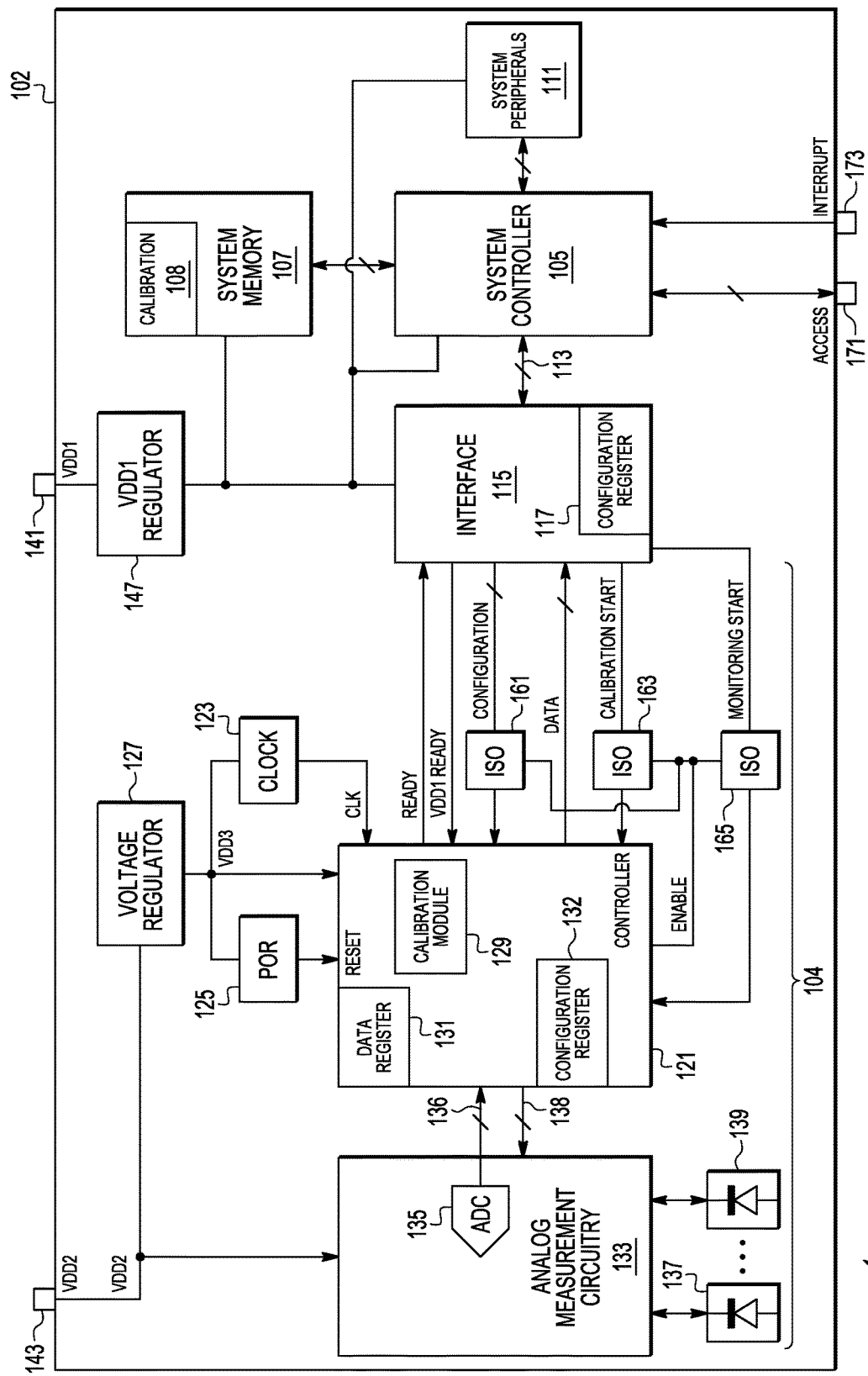
FIG. 1 is a block diagram of an integrated circuit die according to one embodiment of the present invention.

FIG. 1 is a block diagram of a system 101 according to one embodiment of the present invention. In one embodiment, system 101 is implemented on an integrated circuit die 102. Integrated circuit die 102 is formed by processing a semiconductor wafer (not shown) to form circuitry on the semiconductor wafer and then subsequently dicing the wafer into semiconductor die. In some embodiments, system 101 is referred to as a system on a chip (SOC) in that a system is implemented on the die. In some embodiments, system 101 is characterized as a microcontroller, a microprocessor, an embedded controller, or a motor control unit, but maybe characterized as other systems or devices in other embodiments. System 101 includes a system controller 105, a system memory 107, system peripherals 111, and a temperature monitoring system 104.

In one embodiment, system controller 105 is implemented with one or more processor cores that execute code to perform functions of the system. In some embodiments, system 101 is a CPU, microprocessor, DSP, or MCU. System memory 107 may include both volatile and non-volatile on die memory for storing code to be executed, data obtained or received, and/or data to be used in the operation of the system. For example, memory 107 includes calibration data 108 that is used to adjust temperature data provided by the temperature monitoring system 104.

System 101 also includes one or more peripherals 111 such as external bus controllers, voice monitoring circuitry, external memory interfaces, and driver circuitry such as graphics circuitry, keyboard controllers, and mouse controllers. System 101 may include a number of other devices as well such as bus interface controllers. In some embodiments, system 101 may be implemented in a number of different types of electronic systems such as a computer system, a router, a smart phone, tablet, automobile, or embedded system. However, system 101 may be implemented in other types of electronic systems as well and may include other circuitry specifically for those systems.

In the embodiment shown, the memory 107, peripherals 111, and interface 115 are each shown connected to controller 105 with different system busses. However, in other embodiments, these devices may be connected on the same bus. Also, system 101 may have other configurations in other embodiments.

System 101 includes a temperature monitoring system 104 for measuring the temperature at various locations on die 102. Temperature monitoring system 104 is coupled to system controller 105 by a bus 113 and interface 115. Temperature monitoring system 104 includes a controller 121 that includes a memory (e.g. data register 131) for storing measured temperature data and a configuration register 132 for storing configuration information from the system controller 105 for controlling the operation of controller 121 during its operations.

Controller 121 includes a calibration module 129. Calibration module 129 is the portion of controller 121 that controls the operation of the temperature monitoring system 104 during a calibration operation (as subsequently described). In one embodiment, module 129 is the main processor circuitry of controller 121 that controls temperature monitoring system 104 during other operations as well. In other embodiments, module 129 is implemented in hardware or firmware that controls system 104 during the calibration operation. In still other embodiments, module 129 is processing circuitry separate from the processing circuitry of controller 121 that controls system 104 during other operations.

Interface 115 includes bus interface circuitry (not shown) for communicating with system controller 105 on bus 113 and for communicating with controller 121 on various signal lines. Interface 115 includes a memory (configuration register 117) for storing the configuration information received from system controller 105 for passing the information onto controller 121. The configuration information provided to controller 121 is for controlling the operation of controller 121. Interface 115 also receives commands from system controller 105 for providing control signals to controller 121 to execute handshaking protocols.

Temperature monitoring system 104 includes a number of signal lines for exchanging signals between interface 115 and controller 121. The READY signal is provided by controller 121 to indicate that controller 121 is operational and can communicate with the system controller 105. The VDD1 READY signal indicates that power is being provided to the system controller 105. The CONFIGURATION signal lines are used to provide configuration information to controller 121 that controller 121 uses in performing its operations. The DATA signal lines are used to provide measured temperature data to the system controller (via interface 115). The CALIBRATION START signal is an indication for controller 121 to start the calibration mode of operation. The MONITORING START signal is an indication to controller 121 to start the monitoring mode of operation.

The CONFIGURATION signal lines, the CALIBRATION START signal line and the MONITORING START signal line all include an isolation switch (161, 163, and 165), respectfully that are made conductive with the assertion of the ENABLE signal by controller 121. Isolation switches 161, 163, and 165 are utilized to place these signal lines at controller 121 in a known state when the VDD1 power domain is off.

Temperature monitoring system 104 includes a power on reset (POR) circuit 125 for providing a RESET signal to controller 121 during power up. System 104 also includes a clock circuit 123 which provides a clock signal. In one embodiment, clock circuit 123 is a ring oscillator.

Temperature monitoring system 104 includes analog monitoring circuitry 133 and temperatures sensors 137 and 139 for taking temperature measurements on die 102. Sensors (137, 139) are located at various locations throughout die 102. In one embodiment, sensors 137, 139 are characterized as Bipolar Junction Transistor (BJT) type sensors which produce a voltage difference as a pair, that is indicative of the temperature when injected by current from circuitry 133. Circuitry 133 converts the voltage difference into a current.

Analog measurement circuitry 133 includes an analog to digital converter (ADC) 135 that receives the current indicative of the temperature as indicated by the sensors (137, 139) and converts it to a digital value that is provided on bus 136 to controller 121. In one embodiment, circuitry 133 includes a Proportional To Absolute Temperature (PTAT) Generator (not shown) that is coupled to one or more of the sensors (137, 139). The PTAT generator receives a control signal from controller 121 via bus 138 and provides a current that is a function of the temperature sensed by one of the sensors during a measurement operation. In some embodiments, circuitry 133 also includes a bandgap reference generator (not shown) that receives a control signal from controller 121 and provides a reference current to ADC circuit 135 for use in converting an analog signal to a digital value. A further explanation regarding an embodiment of analog measurement circuitry 133 and its operation for generating temperature data can be found in United States Patent Application entitled TEMPERATURE SENSOR CIRCUITRY AND METHOD THEREFOR, having a filing date of Nov. 28, 2016, having an application number of Ser. No. 15/362,092, having a common assignee, and having listed inventors Firas N. Abughazaleh and Venkata Rama Mohan Reddy Mooraka, all of which is incorporated by reference herein in its entirety. However, a temperature monitoring system may include other types of temperature sensors such as a MOSET type sensor and/or include other types of analog temperature circuitry to provide a current indicative of temperature such as in other embodiments.

System 101 includes two power domains. A power domain of a die is a part of a die that is powered from a power source with different power domains of a die being powerable from different power sources. In some embodiments, different power domains of a die may differ from each other by one or more characteristics such as, e.g. having different voltage values, noise requirements, or operating states. In the embodiment shown, integrated circuit die 102 includes a VDD1 external terminal 141 and a VDD2 external terminal 143 each for receiving power to supply to their different power domains. In some embodiments, an external terminal can be for example a pad, bump, ball, pin, or post for accessing circuitry of the integrated circuit die. By providing two power supply voltage external terminals, each of the power domains can operate independently with respect to each other on the integrated circuit die.

Terminal 141 supplies power to VDD1 regulator 147 which supplies a regulated VDD1 voltage to the system controller 105, system memory 107, peripherals 111, and interface 115. In the embodiment shown, VDD1 regulator 147 does not increase or decrease the voltage level of the supply voltage but may so in other embodiments.

Terminal 143 receive a supply voltage VDD2 and supplies that voltage to analog measurement circuitry 133 and to voltage regulator 127. Voltage regulator 127 converts the VDD2 voltage to provide a regulated VDD3 voltage which is different than the VDD2 voltage. In one embodiment, VDD2 is 1.8 volts and VDD1 and VDD3 is 0.8 volts.

Making power domain VDD2 and power domain VDD1 independent of each other on the die enables the power domain of VDD1 to be completely off when temperature monitoring system 104 is gathering temperature data during a calibration mode. The ability to remove power from power domain VDD1 during a calibration mode removes the heat generated by the circuitry of power domain VDD1 from affecting the temperature readings during calibration.

System 101 also includes external access and interrupt terminals 171 and 173. These terminals are utilized to provide and receive data from system 101 externally and to generate external interrupts to the system controller.

Figure 2:
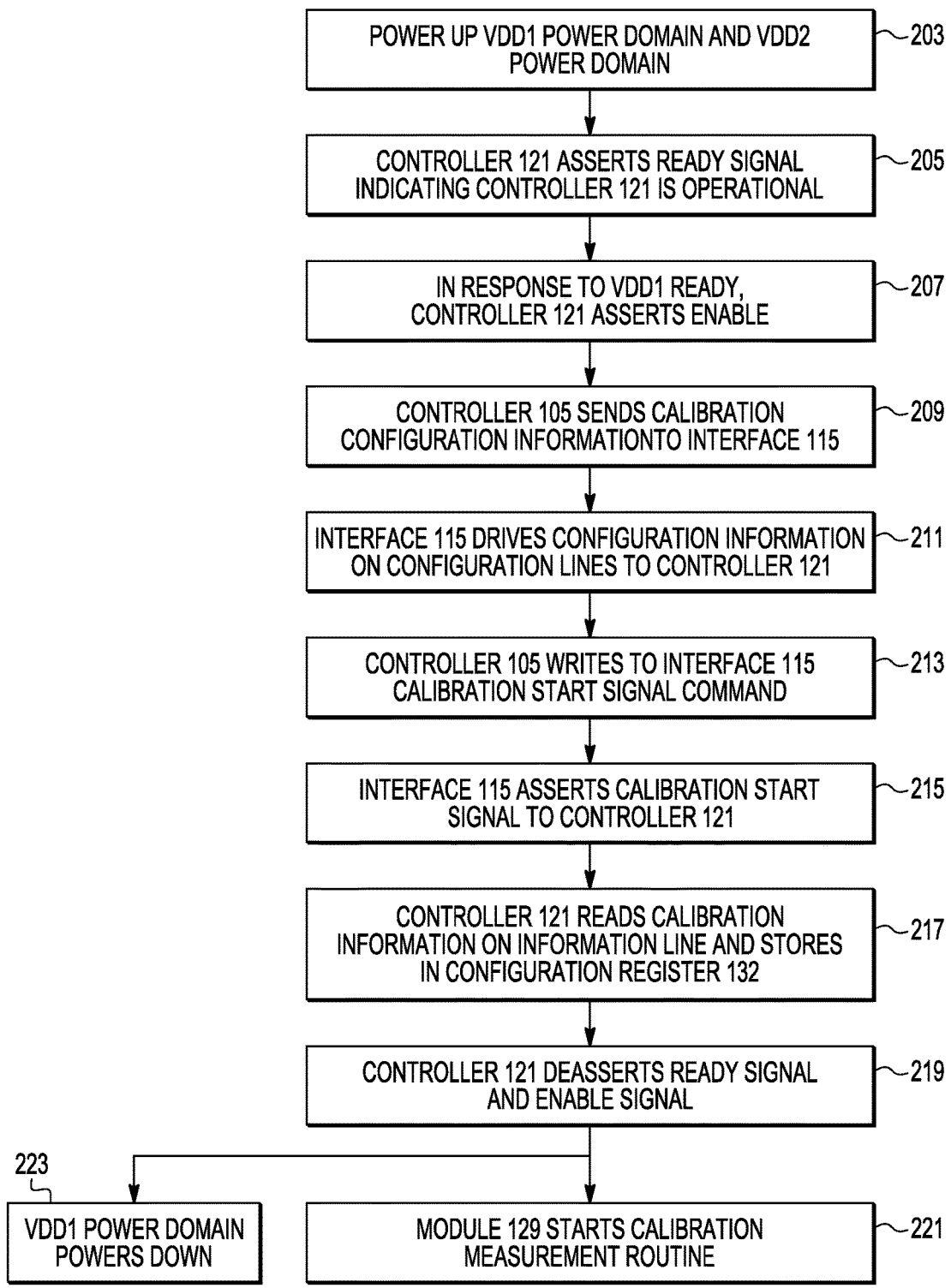
FIG. 2 is a flow diagram of a temperature calibration operation by a system according to one embodiment of the present invention.

FIG. 2 shows an embodiment of a handshaking protocol 201 for the initiation of the calibration mode by temperature monitoring system 104 according to one embodiment of the present invention. Protocol 201 begins with both VDD1 and VDD2 power domains being powered up in operation 203. In operation 205, controller 121 asserts the READY signal on the READY signal line indicating that controller 121 is operational. In one embodiment, controller 121 asserts the READY signal by writing to an internal register (not shown) that is coupled the READY signal line. In operation 207, in response to the VDD1 READY signal being asserted by interface 115, controller 121 asserts the ENABLE signal to make conductive isolation switches 161, 163, and 165 to enable controller 121 to receive signals on those signal lines from interface 115. In one embodiment, the enable signal is asserted by controller 121 writing an enable value to an internal register (not shown) coupled to the ENABLE signal line.

In operation 209, system controller 105 sends calibration configuration information on bus 113 to interface 115. Interface 115 stores the information in register 117 and the drives the configuration information on CONFIGURATION lines to controller 121 in operation 211. The configuration information will be used by controller 121 in performing measurements during the calibration mode.

In operation 213, system controller 105 writes to interface 115 a calibration start signal command on bus 113. In response, interface 115 asserts the CALIBRATION START signal to controller 121 in operation 215. In one embodiment, interface 115 writes to an internal register coupled to the CALIBRATION START signal line a value indicative of an asserted CALIBRATION START signal.

In response to receiving the CALIBRATION START signal, controller 121 reads the calibration information on the CONFIGURATION lines and stores the information in configuration register 132 in operation 217. In one embodiment, configuration register 132 is coupled to calibration module 129 to control the operation of calibration module 129 during a calibration mode. In other embodiments, calibration module 129 reads the configuration information in register 132 during the calibration mode and then performs its operations accordingly. In one embodiment, the calibration information indicates, for example, which sensors to measure, the noise filter parameters utilized, and the circuit cancellation measures implemented. In operation 219, controller 121 deasserts the READY signal and the ENABLE signal to turn off isolation switches 161, 163, and 165. In operation 221, module 129 starts the temperature measurements of the calibration mode. In operation 223, the VDD1 power domain is powered down. In one embodiment, system controller 105 polls a READY bit (not shown) in a register in interface 115 that is responsive to the READY signal. Controller 105 then provides an indication to an external test system (not shown) that the VDD1 power domain can be powered down. The external test system then removes power from the VDD1 terminal 141.

Figure 3:
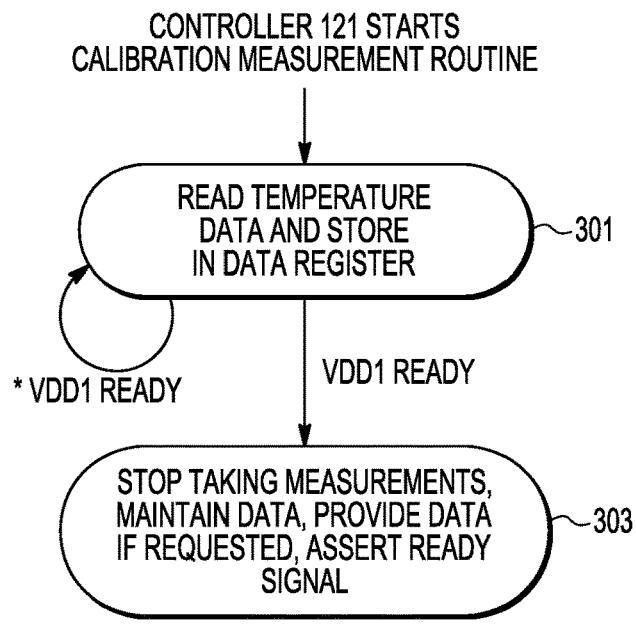
FIG. 3 is a state diagram of the operation of a temperature monitoring system according to one embodiment of the present invention.

FIG. 3 is a state diagram showing the operation of controller 121 during the calibration mode. Controller 121 transitions into the calibration mode state 301 by operation 221 (Shown in FIG. 2). In the calibration state 301, calibration module 129 continuously reads each sensor (137, 139) and records the temperature data in data register 131. In one embodiment, data register 131 has space to record a specific number of measurements per sensor. In some embodiments, a time stamp may be recorded with each measurement. In one embodiment, the calibration module keeps recording measurements continuously and rewriting over the oldest recorded measurement for a sensor with the most recent measurement. In one embodiment, the temperature measurements are made while the die is submerged in an oil bath that is at a specified temperature. In one embodiment, the amount of time spent in the calibration mode state is dependent upon the amount of time needed for the die to reach the oil bath temperature after VDD1 is removed.

While the temperature measurements are being made, power has been removed from the VDD1 power domain. Accordingly, the temperature data recorded is not affected by heat generated from the VDD1 power domain circuitry.

In the embodiment shown, controller 121 remains in state 301 until the VDD1 READY signal is asserted indicating that VDD1 power domain is being powered up. In response, controller 121 goes into state 303 where it stops taking measurements and maintains the data in its data register 131. Controller 121 then provides the data to the system controller via interface 115 on the DATA lines upon request. In one embodiment, the request is made via the CONFIGURATION signal lines, but may be made by other control signal lines (not shown) in some embodiments. In some embodiments, the DATA lines may include a DATA VALID signal to indicate that controller 121 is transferring valid data. Also in state 303, controller 121 asserts the READY signal indicating that it is ready to take measurements.

As described above, module 129 continuously takes temperature measurements until the assertion of the VDD1 READY signal. In other embodiments, module 129 may include a counter to take a finite number of measurements. In some embodiments, the number of measurements may be set by the configuration information.

The data information can be externally supplied from die 102 via the access terminals 171. In some embodiments, die 102 can be placed in calibration mode multiple times, each with the oil bath set at a different temperature. After each time, the data is downloaded from system 101 and correlated with the temperature of the oil bath.

In some embodiments, voltage domain VDD1 may include a power switch (not shown) that is controlled by temperature monitoring system 104. When controller 121 goes into a calibration mode, the power switch is opened to remove power to regulator 147. When a particular number of measurements are made, controller 121 would close the power switch for power to be supplied to regulator 147. However, an advantage of removing power from terminal 141 during a calibration mode is that the leakage current from an internal power switch would not affect the temperature measurements during the calibration mode.

Figure 4:
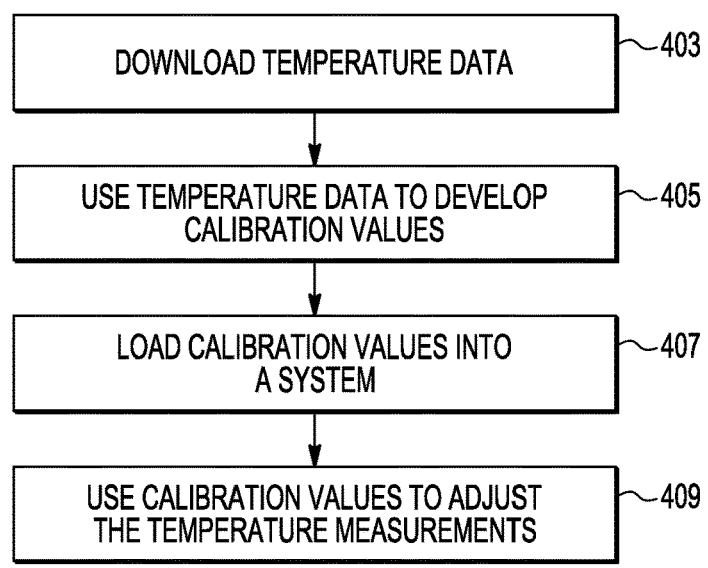
FIG. 4 is a flow diagram of an operation for determining calibration values according to one embodiment of the present invention.

FIG. 4 is a flow diagram illustrating the operations in generating temperature calibration values from the measured temperature data made during a calibration mode. Some or all of these operations may be performed by the system manufacturer, a purchaser of the system, an end user manufacture, and/or by an end user system. In operation 403, the measured temperature values made in the calibration mode are downloaded from system 101 (via the access terminals 171) to an analyzing system such as a computer system of the system manufacture. The temperature data is then analyzed to determine calibration values that will be used to adjust subsequently measured data made by a temperature monitoring system of a similarly designed die. In one embodiment, calibration values are determined from an average of all sensor measurements for each specific temperature. In one embodiment, at least two calibration values are determined (e.g. for a minimum temperature and maximum temperature) assuming a linear temperature curve. However, calibration values for more than two temperatures can be determined in other embodiments. In one embodiment, 9-bit calibration values can be generated for temperatures of 200, 250, 350, and 450 degrees Kelvin (calibration temperature points).

In operation 407, the calibration data is then loaded into one or more systems similar to system 101 and stored as data (108) of memory (107). In some embodiments, the data is stored in fuses or in another type of one time programmable memory. After the systems (101) are sold to customers, the temperature monitoring systems (104) of each system are used to take temperature measurements at each of their sensors (137, 139). When the measured temperature data is provided back to the system controller (105), the system controller (105) uses the calibration data (108) to adjust the measured temperature data to provide a more accurate reading (see operation 409). The calibration values for temperatures between the calibration temperature points can be determined by extrapolation by the system controller. In other embodiments, the calibration data (108) would be stored in the temperature monitoring system (104) and would be used to adjust the measured temperature data prior to being provided to the system controller (105).

In one embodiment, measured temperature data taken during a calibration mode would be obtained from one integrated circuit die from a batch of integrated circuit die. The data obtained from the calibration mode of the one die would be used to generate calibration data and stored in the rest of the integrated circuit die of the batch.

Figure 5:
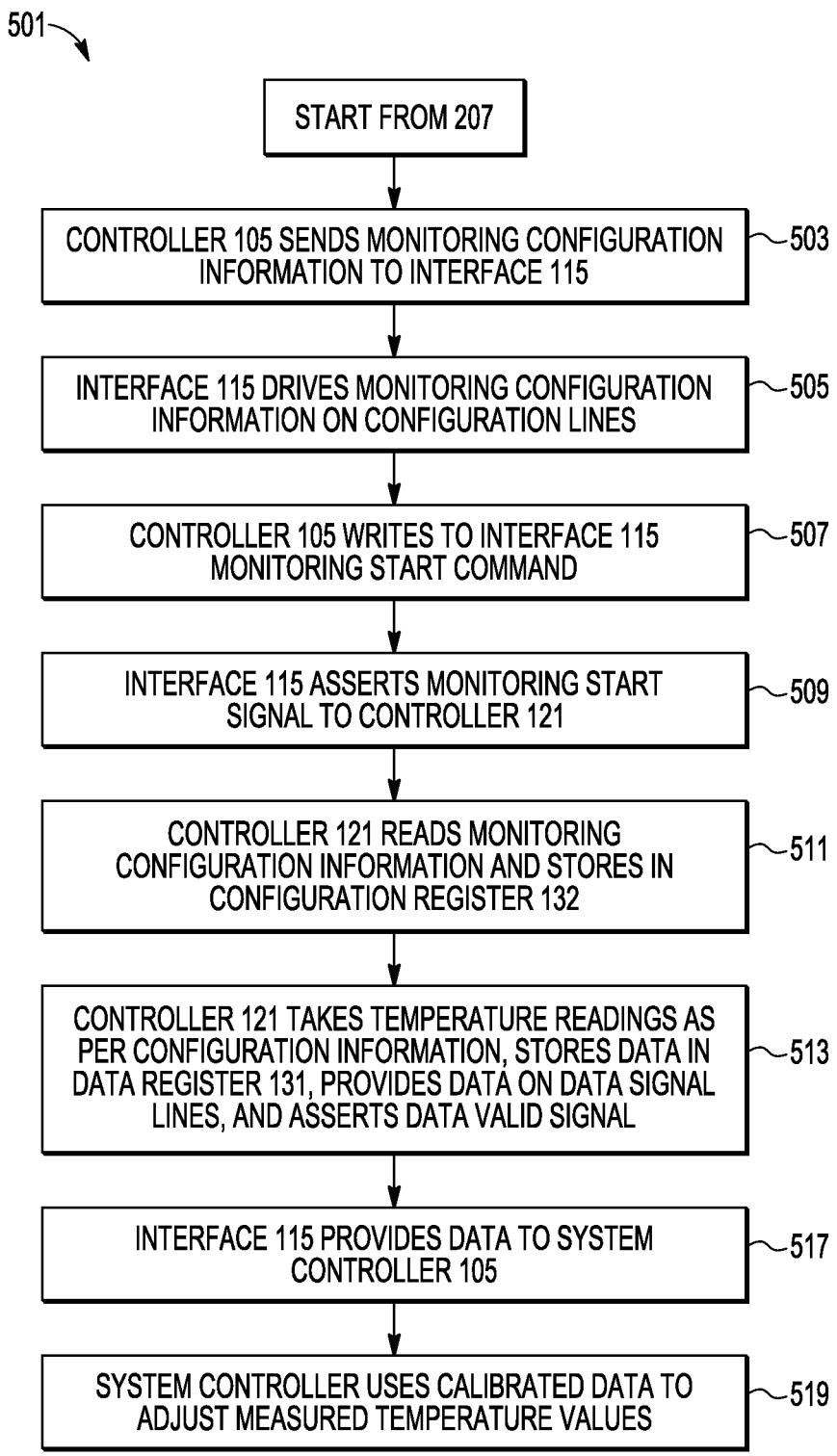
FIG. 5 is a flow diagram of a temperature monitoring operation by a system according to one embodiment of the present invention.

The temperature monitoring system 104 can also be used during the operation of system controller 105 to gather temperature data during the use of the system 101 by an end customer. FIG. 5 shows the operations of system 101 when temperature monitoring system 104 is in a monitoring mode. Protocol 501 picks up from operation 207 of FIG. 2 where the VDD1 READY and ENABLE signals are asserted.

In operation 503, controller 105 sends monitoring configuration information to interface 115 via bus 113. The monitoring configuration information indicates which temperature sensor system 101 would like temperature data taken from. In operation 505, interface 115 drives the monitoring configuration data on the CONFIGURATION lines. In operation 507, controller 105 writes to interface 115 a monitoring start command. In operation 509, interface 115 asserts the MONITORING START signal to controller 121. In operation 511, controller 121 reads the monitoring configuration information and stores the information in configuration register 132. In operation 513, controller 121 takes the temperature reading(s) as per the monitoring configuration information, stores the data in data register 131, provides the data on the data signal lines to interface 115, and asserts a data valid signal (which in one embodiment is a signal line on the DATA signal lines). In operation 517, interface 115 provides the measured temperature data to system controller 105. In operation 519, system controller uses the calibration data 108 stored in memory 107 to adjust the measured temperature data to provide a more accurate temperature data.

With the protocol set forth in FIG. 5, a system 101 is able to use the temperature monitoring system 104 while system controller 105 is powered and performing other functions. In other embodiments, system 104 may take measurements from all sensors on the integrated circuit die 102 in response to a specific monitoring configuration information value and a single assertion of the MONITORING START signal. In some embodiments, different locations of data register 131 may be read by specific configuration information values received from interface 115.

Other embodiments, may include other circuitry, other configurations, and/or other protocols for gathering temperature data during a calibration and/or monitoring mode. In other embodiments, the data register 131 may be external to controller 121 and may be readable by interface 115. Also, the system may include other signal lines (including other control signal lines) other than those shown in FIG. 1.

Although the temperature monitoring system is described above as gathering temperature data in a "calibration" mode for generation calibration values with the other circuitry of the die not receiving power, in other embodiments, such a mode of operation can be used by an end user system to make temperature measurements where it is important that heat generated from the system controller and other circuitry of the VDD1 power domain does not affect the temperature measurements.

In one embodiment, an integrated circuit die includes a system controller, at least one temperature sensor, and a temperature monitoring system. The temperature monitoring system is for obtaining measured temperature data from the at least one temperature sensor. The temperature monitoring system includes a module including circuitry. The module is configured to obtain measured temperature data from the at least one temperature sensor in a mode performed when power is not being provided to the system controller.

In another embodiment, a method for obtaining measured temperature data on an integrated circuit die includes operating a temperature monitoring system of the integrated circuit die in a first mode while a system controller of the integrated circuit die is powered down. In the first mode, the temperature monitoring system obtains measured temperature data from at least one sensor on the integrated circuit die and stores the measured temperature data in a memory. The method includes powering up the system controller, and after powering up the system controller, providing the measured temperature data to the system controller.

In other embodiment, a method for obtaining temperature data on an integrated circuit die includes obtaining by a temperature monitoring system of a first integrated circuit die, measured temperature data from at least one temperature sensor on the first integrated circuit die. The method includes adjusting the measured temperature data by at least one calibration value. The at least one calibration value is developed from temperature measurements made by a temperature monitoring system of a second integrated circuit die operating in a first mode while a system controller of the second integrated circuit die is powered down. In the first mode, the temperature monitoring system of the second integrated circuit die obtained the measured temperature data from at least one sensor on the second integrated circuit die. After being powered up, the system controller of the second integrated circuit die obtained the measured temperature data. The second integrated circuit die is of a similar design to the first integrated circuit die.

What is claimed is:

1. An integrated circuit die comprising:
a system controller;
at least one temperature sensor;
a temperature monitoring system, the temperature monitoring system for obtaining measured temperature data from the at least one temperature sensor, wherein the temperature monitoring system includes a module including circuitry, the module configured to obtain measured temperature data from the at least one temperature sensor in a mode performed when power is not being provided to the system controller;
wherein the temperature monitoring system includes an input to receive an indication of whether power is being provided to the system controller, wherein in the mode, the module stops taking data in response to the indication changing from indicating that the system controller is not receiving power to an indication that the system controller is receiving power.

2. The integrated circuit die of claim 1 wherein in the mode, the module continuously obtains data from the at least one temperature sensor until receiving an indication that power is being supplied to the system controller.

3. The integrated circuit die of claim 1 wherein the system controller is located in a first power domain of the integrated circuit die and the module is located in a second power domain of the integrated circuit die.

4. The integrated circuit die of claim 3 wherein the temperature monitoring system includes circuitry in the second power domain that receives a signal on a signal line from circuitry in the first power domain, wherein the signal line includes an isolation gate that isolates the circuitry in the second power domain from the circuitry in the first power domain on the signal line.

5. The integrated circuit die of claim 3 wherein the integrated circuit die includes a first external power terminal for receiving power to power the first power domain and a second external power terminal for receiving power to power the second power domain.

6. The integrated circuit die of claim 1 wherein the temperature monitoring system includes a memory for storing measured temperature data, wherein the measured temperature data is available to the system controller when not in the mode.

7. The integrated circuit die of claim 1 wherein the temperature monitoring system is capable of obtaining measured temperature data from the at least one temperature sensor when the system controller is powered up in a second mode of operation.

8. A method for obtaining measured temperature data on an integrated circuit die, the method comprising:
operating a temperature monitoring system of the integrated circuit die in a first mode while a system controller of the integrated circuit die is powered down, wherein in the first mode, the temperature monitoring system obtains measured temperature data from at least one sensor on the integrated circuit die and stores the measured temperature data in a memory;
powering up the system controller;
after powering up the system controller, providing the measured temperature data to the system controller;
providing an indication to the temperature monitoring system that the system controller is being powered up, wherein the temperature monitoring system exits the first mode and stops obtaining measured temperature data from the at least one sensor in response to receiving the indication.

9. The method of claim 8 further comprising:
prior to the operating the temperature monitoring system in the first mode, providing an indication to the temperature monitoring system that the system controller is being powered down, wherein the temperature monitoring system enters the first mode at least in response to receiving the indication.

10. The method of claim 8, wherein the temperature monitoring signal receives a signal on a signal line from circuitry that is powered up and is powered down with the system controller, wherein the temperature monitoring system is isolated on the signal line from the circuitry that is powered up and is powered down with the system controller when in the first mode.

11. The method of claim 8, wherein in the first mode, the temperature monitoring system continuously obtains measured temperature data from the at least one sensor on the integrated circuit die and stores the measured temperature data in the memory.

12. The method of claim 8 wherein the operating the temperature monitoring system in the first mode occurs when the integrated circuit die is in a hot oil bath.

13. The method of claim 8 wherein the integrated circuit die includes a first external power supply terminal that supplies power for the temperature monitoring system and a second external power supply terminal that supplies power for the system controller, wherein power is not supplied to the second external power supply terminal when the system controller is powered down in the first mode.

14. A method for obtaining measured temperature data on an integrated circuit die, the method comprising:
operating a temperature monitoring system of the integrated circuit die in a first mode while a system controller of the integrated circuit die is powered down, wherein in the first mode, the temperature monitoring system obtains measured temperature data from at least one sensor on the integrated circuit die and stores the measured temperature data in a memory;
powering up the system controller;
after powering up the system controller, providing the measured temperature data to the system controller;
after the providing the measured temperature data to the system controller, providing the measured temperature data to an external system;
determining by the external system, temperature calibration values from the measured temperature data.

15. The method of claim 14 further comprising:
loading the temperature calibration values into a memory of a second integrated circuit die, the second integrated circuit die including a system controller and a temperature monitoring system, wherein the temperature calibration values are for adjusting by the second integrated circuit die, measured temperature data made by the temperature monitoring system of the second integrated circuit die.

16. A method for obtaining temperature data on an integrated circuit die, the method comprising:

obtaining by a temperature monitoring system of a first integrated circuit die, measured temperature data from at least one temperature sensor on the first integrated circuit die;

adjusting the measured temperature data by at least one calibration value, wherein the at least one calibration value is developed from temperature measurements made by a temperature monitoring system of a second integrated circuit die operating in a first mode while a system controller of the second integrated circuit die is powered down, wherein in the first mode, the temperature monitoring system of the second integrated circuit die obtained the measured temperature data from at least one sensor on the second integrated circuit die, and after being powered up, the system controller of the second integrated circuit die obtained the measured temperature data, wherein the second integrated circuit die is of a similar design to the first integrated circuit die.

17. The method of claim 16 wherein the adjusting is performed by a system controller of the first integrated circuit die.

18. The method of claim 16 wherein the obtaining by temperature monitoring system of the first integrated circuit die is performed while power is provided to a system controller of the first integrated circuit die.

19. A method for obtaining temperature data on an integrated circuit die, the method comprising:

obtaining by a temperature monitoring system of a first integrated circuit die, measured temperature data from at least one temperature sensor on the first integrated circuit die;

adjusting the measured temperature data by at least one calibration value stored in a memory of the first integrated circuit die and developed from temperature measurements made by a temperature monitoring system of a second integrated circuit die operating in a first mode while a system controller of the second integrated circuit die is powered down, wherein in the first mode, the temperature monitoring system of the second integrated circuit die obtained the measured temperature data from at least one sensor on the second integrated circuit die, and after being powered up, the system controller of the second integrated circuit die obtained the measured temperature data, wherein the second integrated circuit die is of a similar design to the first integrated circuit die.

\* \* \* \* \*